(12) United States Patent
Dohmann et al.

(10) Patent No.: US 8,844,827 B2
(45) Date of Patent: Sep. 30, 2014

(54) CHIP CARD, AND METHOD FOR THE SOFTWARE-BASED MODIFICATION OF A CHIP CARD

(75) Inventors: Dierk Dohmann, Duesseldorf (DE); Frank Famulla, Duesseldorf (DE)

(73) Assignee: Vodafone Holding GmbH, Duesseldorf (DE)

( * ) Notice: Subject to any disclaimer, the term of this patent is extended or adjusted under 35 U.S.C. 154(b) by 0 days.

(21) Appl. No.: 12/310,936

(22) PCT Filed: Sep. 3, 2007

(86) PCT No.: PCT/EP2007/059171
§ 371 (c)(1),
(2), (4) Date: Aug. 13, 2009

(87) PCT Pub. No.: WO2008/031736
PCT Pub. Date: Mar. 20, 2008

(65) Prior Publication Data
US 2009/0302119 A1 Dec. 10, 2009

(30) Foreign Application Priority Data
Sep. 12, 2006 (DE) .......................... 10 2006 042 723

(51) Int. Cl.
*G06K 19/00* (2006.01)
*G07F 7/10* (2006.01)
*G06Q 20/34* (2012.01)

(52) U.S. Cl.
CPC .................................. *G07F 7/1008* (2013.01); *G06Q 20/3552* (2013.01)
USPC ............................ 235/492; 235/451; 235/487

(58) Field of Classification Search
USPC .......................................... 235/451, 487, 492
See application file for complete search history.

(56) References Cited

U.S. PATENT DOCUMENTS

| | | | | |
|---|---|---|---|---|
| 5,942,738 A * | 8/1999 | Cesaire et al. | ................. | 235/380 |
| 6,005,942 A * | 12/1999 | Chan et al. | ..................... | 713/187 |
| 6,065,037 A * | 5/2000 | Hitz et al. | ....................... | 709/200 |
| 6,598,049 B1 * | 7/2003 | Moriyama | .................... | 707/744 |

(Continued)

FOREIGN PATENT DOCUMENTS

| | | |
|---|---|---|
| DE | 19633466 A1 | 2/1998 |
| WO | 9628795 A1 | 9/1996 |

(Continued)

OTHER PUBLICATIONS

"Handbuch der chipkarten," 1999, Hanser, Germany, XP 002471250.

*Primary Examiner* — Michael G Lee
*Assistant Examiner* — Matthew Mikels
(74) *Attorney, Agent, or Firm* — Kriegsman & Kriegsman (57) ABSTRACT

The invention relates to a chip card, particularly a smart card, having an operating system which is implemented on the chip card and which controls the functions of the chip card, and having a first operating system kernel level which represents the core of the operating system and in which the process and data organization of the operating system is established, for which a second, uniform operating system kernel level is provided in which those functions of the first operating system kernel level are defined that can be addressed from outside the operating system, and that an interface is provided for accessing the second, uniform operating system kernel level from outside the operating system. Further, the invention relates to a method for the software-based modification of a chip card of this type.

14 Claims, 5 Drawing Sheets

(56) References Cited

U.S. PATENT DOCUMENTS

2003/0065982 A1 4/2003 Grimaud et al.
2004/0154027 A1 8/2004 Vandewalle et al.
2005/0137737 A1* 6/2005 Sato et al. .................. 700/121
2006/0048223 A1 3/2006 Lee et al.

FOREIGN PATENT DOCUMENTS

| WO | 9843212 A1 | 10/1998 |
| WO | 0068903 A1 | 11/2000 |
| WO | WO 2005098622 A1 * | 10/2005 |

* cited by examiner

CHIP CARD, AND METHOD FOR THE SOFTWARE-BASED MODIFICATION OF A CHIP CARD

The present invention relates to a chip card, particularly a smart card, having an operating system which is implemented on the chip card and which controls the functions of the chip card, and having a first operating system kernel level which represents the core of the operating system and in which the process and data organization of the operating system is established. Further, the invention relates to a method for the software-based modification of a chip card, particularly a smart card, having an operating system which is implemented on the chip card and which controls the functions of the chip card, and having a first operating system kernel level which represents the core of the operating system and in which the process and data organization of the operating system is established.

Chip cards have been utilized in everyday life for some time. Chip cards, also often called smart cards or integrated circuit cards (ICCs), are special plastic cards with a built-in chip, which has a hardware logic, a memory or even a microprocessor. Thus chip cards are used, among other things, in the form of SIM cards (SIM=Subscriber Identity Module) or USIM cards (USIM=Universal Subscriber Identity Module), whereby they are inserted into a mobile phone and serve to identify the user in the communications network.

In the meantime, processors in the chip cards continue to become more powerful and are thereby also more user-friendly relative to programming. So-called Java cards have been in existence for several years, whereby the processors in Java cards possess an interpreter for applications written in Java. Thus, the chip card is moving away from the arena of hardware platforms that are difficult to program and in future will become increasingly more important.

The basic task of a chip card is to store and manage quantities of data and to make the data rapidly available, whereby it is different from other memory media due to the fact that a chip card protects the data from any modification and very often also against simply reading out. This is achieved by making the access to the internal memory of the card not directly accessible to the outside; rather, access is possible only via an intermediately connected instance, which permits total access only after authentication and with sufficient authorization. This instance is executed either in the form of a special programming logic or by the software of a microprocessor, each time depending on the complexity of the task.

This means that chip cards cannot be modified or read out in a uniform manner simply to the requirements specific to a service provider. Thus, for example, a telecommunications network service provider, particularly a mobile-phone network service provider, in developing a uniform service provider-specific chip card will run up against difficulties if the initial product, the chip card, is produced by different manufacturers.

At the present time, two methods thus exist for the development of a uniform service provider-specific chip card.

On the one hand, a uniform, compatible chip-card operating system can be developed and implemented on all chip cards of different manufacturers. In fact, this method has the advantage that exact communication knowledge is present between the chip or the hardware and the operating system of the chip card, so that chip cards are 100% compatible. There exists the disadvantage, of course, that the development of a uniform, compatible chip-card operating system is very complex and costly. Further, it is a disadvantage that an error in the uniform, compatible chip-card operating system would lead to the circumstance that all chip cards would be affected.

On the other hand, the possibility exists that a service provider of chip cards requires compatibility with respect to the operating system of chip cards on the part of the different manufacturers. This in fact would have the advantage that an error in an operating system of one manufacturer would not lead to the circumstance that all chip cards would be affected. By distributing the production of chip cards to several manufacturers, the chance is greater that at least some of the chip cards would be fully capable of function. Of course, the service provider of the chip cards, for example, a service provider/operator of a communications network will incur an enormous expenditure for testing the chip cards of different manufacturers for uniformity Further, the service provider of the chip cards does not have sufficient knowledge of how the operating system is accessed on the chip or the hardware.

The object of the present invention is to further develop a chip card of the type named initially in such a way that an inter-operability of chip cards, in particular their functions, is assured, so that a modification of the operating system of chip cards that is independent of the manufacturer will be made possible. Further, a method for the software-based modification of a chip card of the type named initially will be created, by means of which an inter-operability of chip cards will be assured and which makes possible a modification of the operating system of chip cards that is independent of the manufacturer.

These objects will be accomplished according to the invention by a chip card with the features according to the independent patent claim 1 as well as by a method for the software-based modification of a chip card with the features according to the independent patent claim 8. Additional advantages, features, details, aspects and effects of the invention result from the subclaims as well as from the description. Features and details, which are described in connection with the chip card according to the invention according to patent claim 1, thus also apply, of course, in connection with the method according to the invention for the software-based modification of a chip card according to patent claim 8, and vice versa.

According to the first aspect of the invention, the object is accomplished by a chip card, particularly by a smart card, having an operating system which is implemented on the chip card and which controls the functions of the chip card, and having a first operating system kernel level which represents the core of the operating system and in which the process and data organization of the operating system is established, whereby a second, uniform operating system kernel level is provided, in which those functions of the first operating system kernel level that can be addressed from outside the operating system are defined, and whereby an interface is provided for accessing the second, uniform operating system kernel level from outside the operating system.

This type of chip card makes possible an inter-operability of the functions of the chip card, so that a modification of the operating system of chip cards that is independent of the manufacturer is made possible. Inter-operability is here the capacity of independent, heterogeneous operating system kernel levels to operate together as seamlessly as possible in order to exchange information and data on the chip card in an efficient and useful manner and to make it available to the user, without the necessity of special messages between the operating system kernel levels for this purpose. The inter-operability of the functions of chip cards is assured due to the fact that the operating system kernel levels use the same file format or the same protocol.

An operating system kernel controls the chip and its functions on the so-called "low level", which is comparable to BIOS in the PC world. The commands and functions of the operating system kernel can be different depending on the chip and the manufacturer.

A chip card of this type according to the invention makes it possible for a service provider of chip cards to implement his own operating system, which controls the fundamental functions of the chip of the chip card, such as, e.g., memory management. The functions of the chip card for the most part are placed directly on the operating system kernel and, for example, cannot be reached by a so-called application level. That is, the fundamental functions of a chip card are managed by the operating system of the chip card, which has been provided by the manufacturer. The operating system represents software which improves, expands, simplifies and controls the communications between a user and the chip of the chip card. In order to provide communication with the chip, the operating system utilizes the operating system kernel. The operating system kernel manages the proprietary and rudimentary commands which have been developed by the manufacturer of the chip of the chip card in order to control the chip. The operating system kernel permits complete access to the chip of the chip card, whereby the operating system is usually developed by the manufacturers in such a way that several functions are not accessible to the user for security reasons.

In the chip card according to the invention, a second, uniform operating system kernel level is provided, in which those functions of the first operating system kernel level that can be addressed are defined, and an interface is provided for accessing the second, uniform operating system kernel level from outside the operating system. By means of the second, uniform operating system kernel level, it is made possible for a service provider of the chip card to access the functions in the first operating system kernel level, which are defined by the manufacturer of the chip card and which represent the core of the operating system and in which the process and data organization of the operating system are established. The second, uniform operating system kernel level makes possible a uniform accessing of functions of the first operating system kernel level. Further, the second, uniform operating system kernel level opens up the possibility for the service provider of the chip card to define individual, selected functionalities. That is, the second, uniform operating system kernel level preferably makes possible complete access to the first operating system kernel level in order to control the chip. The interface makes possible access to the second, uniform operating system kernel level and in this way to the operating system of the chip card. This means that the interface provides inter-operable access to the manufacturer-specific operating system functions, which can than be utilized by inter-operable applications or functionalities. The interface contains inter-operably defined rules, variables and logic, in order to control the chip of the chip card.

The advantages of a chip card of this type lie in the fact that the operating system of the manufacturer of the chip card can be reduced to a minimum. By implementing the second, uniform operating system kernel level, including its functionality, service providers of chip cards, such as, for example, mobile-phone network service providers, can leave the production of chip cards to different manufacturers. The second, uniform operating system kernel level can thus be implemented in the chip card later on. In this way, the service provider of chip cards has his own access to the operating system and subsequently can correct errors of the operating system or insert new features into the operating system. This can be done, for example, simply via a wireless interface. It is possible for the service provider of the chip card to access the operating system or the functionalities of the operating system independent of the manufacturer by implementing the second, uniform operating system kernel level on chip cards, particularly from different manufacturers. For example, by implementing the second, uniform operating system kernel level, the provider can always read out different chip cards in the same way.

A chip card in which the interface is implemented in the operating system of the chip card is preferred. In this way, the service provider of chip cards can directly access the operating system of chip cards. The implementation of the interface in the operating system makes possible an access to the operating system or to the functionalities of the operating system from outside. In this case, access to the operating system via the interface is already provided by the manufacturers of chip cards. This makes it possible for another person, in particular the service provider of a telecommunications network, to implement his own operating system kernel level with access to the operating system in the chip card. Due to the access to the operating system provided by the manufacturer of the chip card, the accessing party, so to speak, can define his own operating system.

By means of the chip card according to the invention, operating system functions can be developed once, for example, by the service provider of a telecommunications network, and executed via the interface to different chip cards. In this way, the operating system can be accessed from the outside and a new, virtual operating system can be created, which is addressable from outside.

Further, a chip card is preferred, in which an addressable switch is provided in the operating system, particularly in the second, uniform operating system kernel level. This switch represents a type of switch by means of which an operating system function will be executed by switching to an operating system function either based on the operating system of the manufacturer of the chip card or based on the virtual operating system which is implemented via the interface. This switch is addressable in order to define whether an operating system function based on the virtual operating system or on the operating system provided by the manufacturer of the chip card is to be executed. In the case when access to the functionalities of the chip of the chip card is made via the virtual operating system, the operating system provided by the manufacturer deactivates its own operating system functionalities which utilize the same rudimentary commands. In the case when several functionalities of the virtual operating system which access the functionalities of the chip are cancelled, the operating system activates its own operating system functionalities which utilize the same rudimentary commands. The addressable switch, also designated a switch logic, is implemented in the operating system for this purpose. A chip card/the chip card is Java-based, which has at least one Java virtual machine and which has a Java application level, [and] has the advantage that at least several operating system kernel functions can be accessed. By means of a Java virtual machine, the control of the operating system kernel functions is made uniform relative to one application level. That is, the first operating system kernel level is different for the chip of chip cards, while the application level is the same. Application developers can utilize the application level for the development of applications within the framework of functions that offer the Java virtual machine. That is, due to the Java virtual machine, applications can also run on other chips of other manufacturers.

The second, uniform operating system kernel level accurately defines which functions of the operating system kernel will be addressable later on the application level; here, the second, uniform operating system kernel level exists in addition to the Java virtual machine or in fact, several of its functions, e.g. the read/write of a buffer, can be covered. In particular, all operating system kernel functions, which use an operating system, such as, e.g., defragmenting commands for memory management, can be defined and made uniform in the second, uniform operating system kernel level.

Due to the application level, which can be accessed via the interface on the second, uniform operating system kernel level, operating system functions need only be developed once. The operating system functions can then be executed on other chip cards, which also have a second, uniform operating system kernel level.

An application manufacturer can then convert all operating system functions to the application level and thus to a virtual operating system, which can be carried on all chip cards having a second, uniform operating system kernel level and having an interface for accessing the second, uniform operating system kernel level from outside the operating system. Here, the application level can also be based on Java or another programming language.

If the application level for the virtual operating system is also based on Java, the Java virtual machine would be expanded by the second, uniform operating system kernel level.

Due to the second, uniform operating system kernel level, the manufacturer-specific operating system of a chip card that controls the fundamental functions of a chip can be bypassed. These fundamental functions usually cannot be reached by the application level, since these functions for the most part are placed directly on the first operating system kernel level. In order to reach these, however, a chip card is advantageous, in which the Java application level is joined with the second, uniform operating system kernel level via the interface in the operating system.

The interface permits the inter-operable access of the application level to the operating system or to the functionalities of the operating system. The interface is thus particularly designed as a programming interface API (API=Application Programming Interface) or is joined with the interface in the operating system. This creates the inter-operable access to the manufacturer-specific operating system features. In this way, the manufacturer-specific operating system features can be utilized. The programming interface defines the commands by which a developer can program uniform operating system kernel features, whereby inter-operable rules, variables and logic from the programming interface of the second, uniform operating system kernel level are utilized. The virtual operating system features can utilize small standard applications, which utilize the programming interface, in order to influence or access the operating system provided by the chip-card manufacturer.

The second, uniform operating system kernel level of the chip card can exist in addition to the Java virtual machine. A chip card is preferred, however, in which the second, uniform operating system kernel level is implemented in the at least one Java virtual machine. In this way, access to the functionalities of the operating system of the chip card can be made via the Java virtual machine.

According to a second aspect of the invention, the object is accomplished by a method for the software-based modification of a chip card, particularly a smart card, having an operating system which is implemented on the chip card and which controls the functions of the chip card, and having a first operating system kernel level which represents the core of the operating system and in which the process and data organization of the operating system is established, whereby accessing a second, uniform operating system kernel level from outside the operating system is made via an interface, whereby in the second, uniform operating system kernel level, those functions of the first operating system kernel level that can be addressed from outside the operating system are defined.

A method of this type for the software-based modification of a chip card assures the inter-operability of the chip card and makes possible a modification of the operating system of the chip card that is independent of the manufacturer. Access is made via the interface to the second, uniform operating system kernel level, which is implemented in the chip card. The second, uniform operating system kernel level accesses the operating system of the chip card or the functionalities of the chip card; i.e., the functions, for example, the memory processes of the first operating system kernel level, which is provided by the manufacturer, are defined in the second, uniform operating system kernel level. Access from outside the operating system means that the functionalities of the operating system can be utilized, for example, via an application level. The advantage of implementing the second, uniform operating system kernel level lies in the fact that a uniform access to the process and data organization of the operating system is made possible via the interface, which accesses the second, uniform operating system kernel level. That is, access can always be made in the same way, since the second, uniform operating system kernel level on different chip cards can be implemented. In contrast, access only to the first operating system kernel level is not always possible by the same means, i.e., via the same application level, since the first operating system kernel level is defined differently by each manufacturer of chip cards. By implementing the second, uniform operating system kernel level, it is possible for a service provider of a telecommunications network to create his own so-called virtual operating system, by means of which he can access any chip card in the same way, even if manufactured by different manufacturers, in order to address the functionalities of the operating system in a uniform manner. Access can thus be made via a Java application or by a Java virtual machine.

Basically, the invention is not limited to specific types of chip cards. Advantageously, however, it involves so-called smart cards.

The invention will be explained in more detail below on the basis of possible embodiment examples with reference to the appended drawings. Here.

Figure 1:
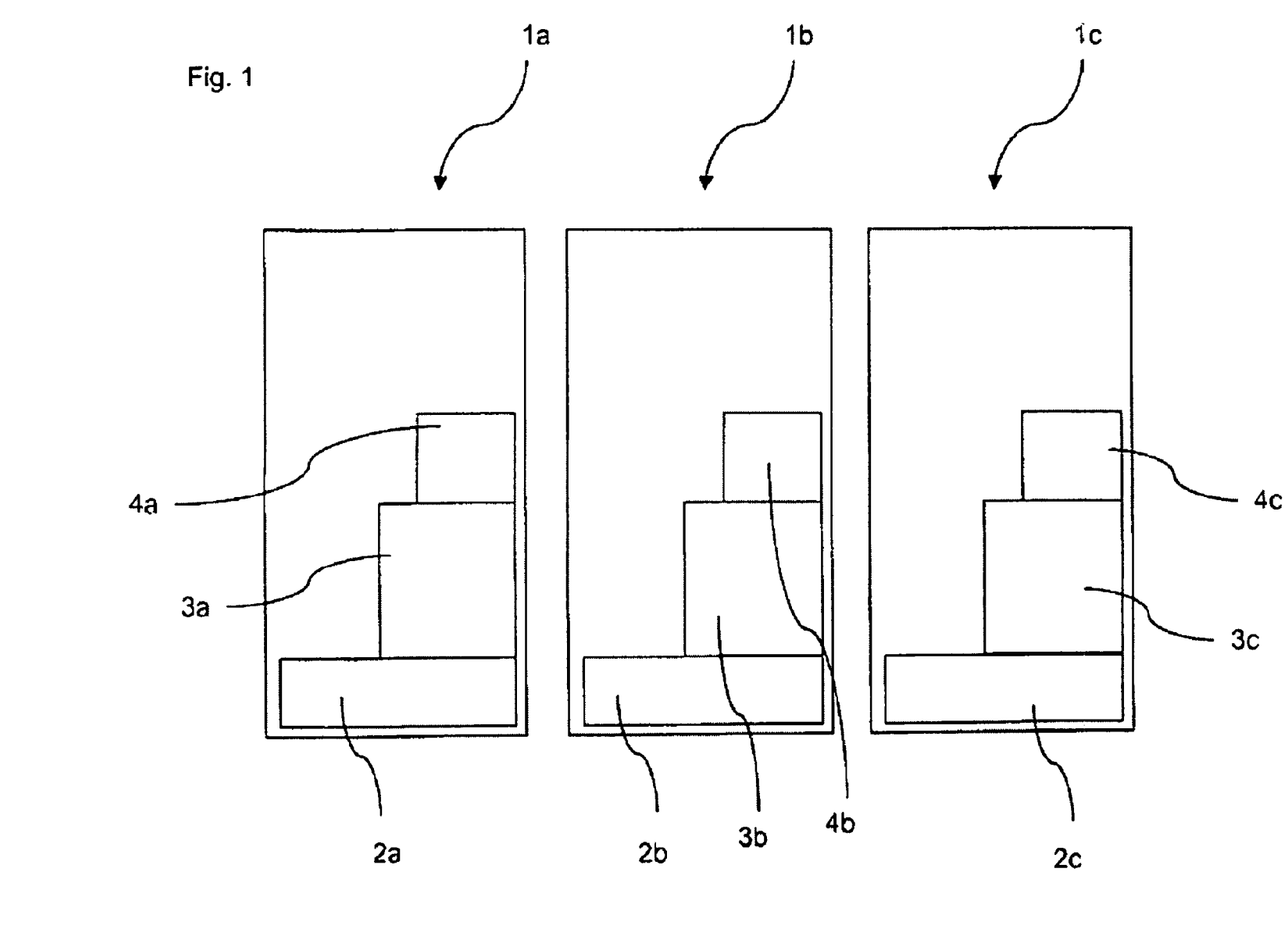
FIG. 1 shows known chip cards with operating system kernel level and application.

FIG. 1 shows schematically the construction of three known chip cards 1a, 1b, 1c of three different manufacturers. Each of the three chip cards 1a, 1b, 1c has its own first operating system kernel level 2a, 2b, 2c, whereby the operating system kernel levels 2a, 2b, 2c of the three chip cards 1a, 1b, 1c are designed differently. In order to have access to the functionalities of the first operating system kernel levels 2a, 2b, 2c, each chip card 1a, 1b, 1c has a Java virtual machine 3a, 3b, 3c. An application of application levels 4a, 4b, 4c to the functions/functionalities of the first operating system kernel levels 2a, 2b, 2c of the respective chip card 1a, 1b, 1c can access or communicate with these first operating system kernel levels via the respective Java virtual machine 3a, 3b, 3c. In these known chip cards 1a, 1b, 1c, it is a disadvantage that the access to the functionalities of the first operating system kernel levels 2a, 2b, 2c and thus to the operating system of chip cards 1a, 1b, 1c is not made uniformly, since in each chip card 1a, 1b, 1c, different manufacturer-specific first operating system kernel levels 2a, 2b, 2c are implemented. A service provider of chip cards, such as a telecommunications network service provider, for example, who is interested in always having the same access or a uniform control of the chip card with his own software, must therefore order the chip card from only one manufacturer. This would lead to an undesirable dependence on one manufacturer.

Figure 2:
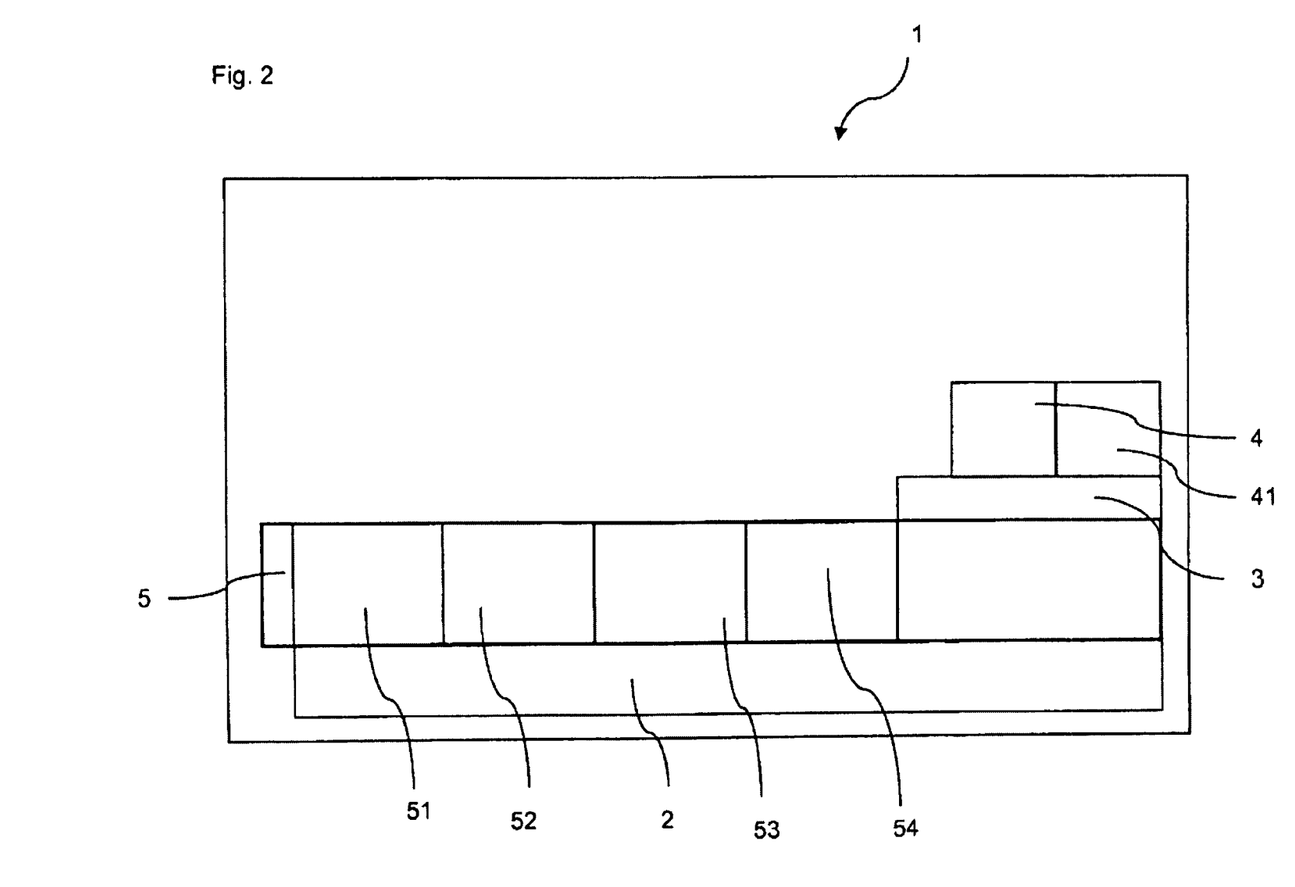
FIG. 2 shows known chip cards with operating system kernel level, operating system and application.

FIG. 2 shows the schematic construction of a known chip card 1 with an operating system kernel level 2, an operating system 5 and applications 41. Further, chip card 1 which is shown has a Java virtual machine 3, by means of which applications 41 of application level 4 access or communicate with the functionalities of the first operating system kernel level 2 of chip card 1. In addition to Java virtual machine 3, chip card 1 has a manufacturer-specific operating system 5 which controls the fundamental functions, such as, for example, the memory management, of chip card 1 or of the chip of chip card 1. These fundamental functions or functionalities are placed for the most part directly on the first operating system kernel level 2 and thus, as a disadvantage, cannot be reached via Java virtual machine 3 through the applications 41 of application level 4.

In the case of several manufacturers, after implementing Java virtual machine 3, it may happen that several parts of operating system 5 have been converted as a Java application to reach these functionalities of the first operating system kernel level 2. This possibility of controlling operating system kernel level 2 completely by the applications of application level 4, however, is specific to the manufacturer and not uniformly defined for each different manufacturer. The functionalities of operating system 5 may be, for example, memory management 51, security functions 52, air interfaces 53 or other functions 54.

Figure 3:
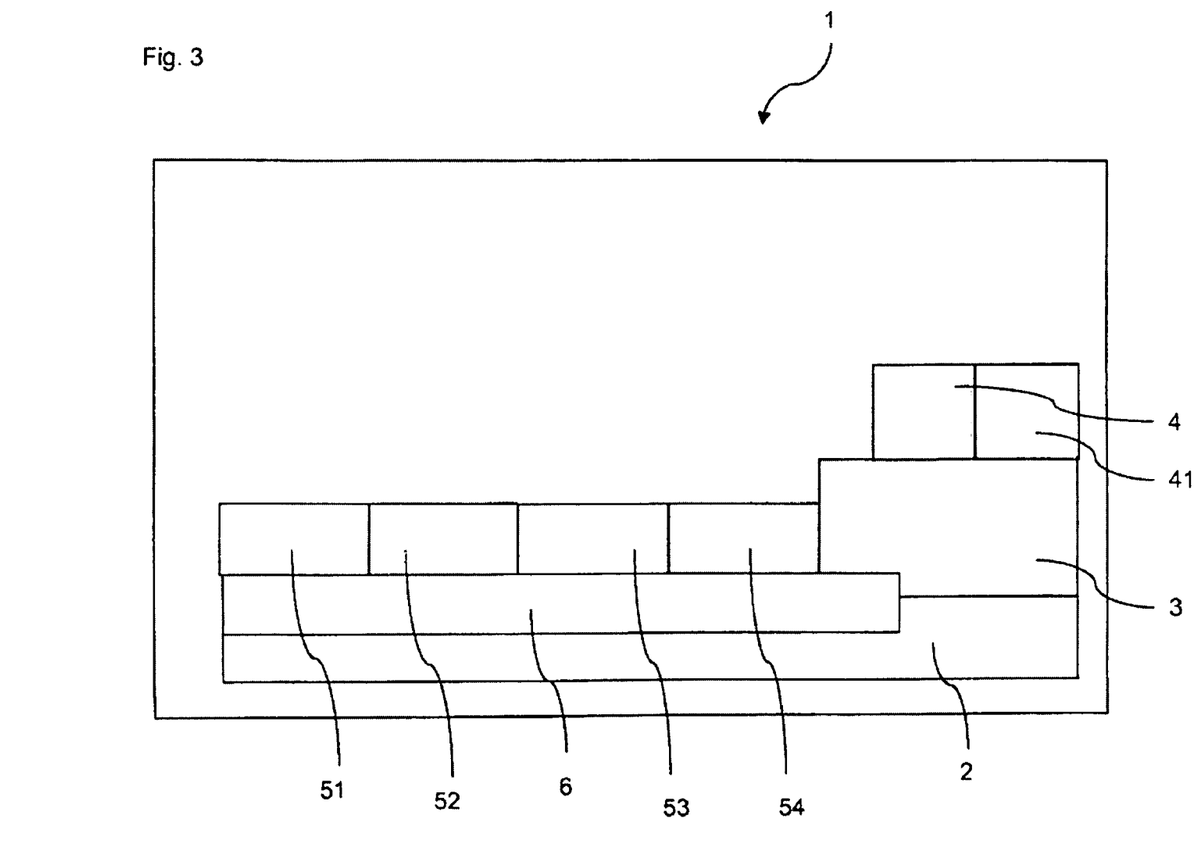
FIG. 3 shows a chip card according to the invention with a second, uniform operating system kernel level.

FIG. 3 shows a chip card 1 according to the invention having a second, uniform operating system kernel level 6. By means of the additional implementation of the second, uniform operating system kernel level 6, it is possible to define which functions/functionalities 51, 52, 53, 54 of the operating system of chip card 1 are addressable by applications 41 of application level 4. The second, uniform operating system kernel level 6 can thus exist in addition to Java virtual machine 3, or several of its functions, such as, for example, the read/write of a buffer can be covered. All functions of the first operating system kernel level 2 of the chip card, which uses an operating system, can be defined and made uniform in the second, uniform operating system kernel level 6. The functions may be, for example, defragmenting commands for memory management 51, security functions 52, air interfaces 53 or other functions 54. The second, uniform operating system kernel level 6 makes it possible for a service provider of chip cards 1 to uniformly control chip cards 1 of different manufacturers with different first operating system kernel levels 2. That is, the functionalities 51, 52, 53, 54 of operating system 5 of different chip cards 1 can be uniformly accessed by the second, uniform operating system kernel level 6, or the functionalities of operating system 5 can be uniformly addressed by applications 41 of application level 4.

Figure 4:
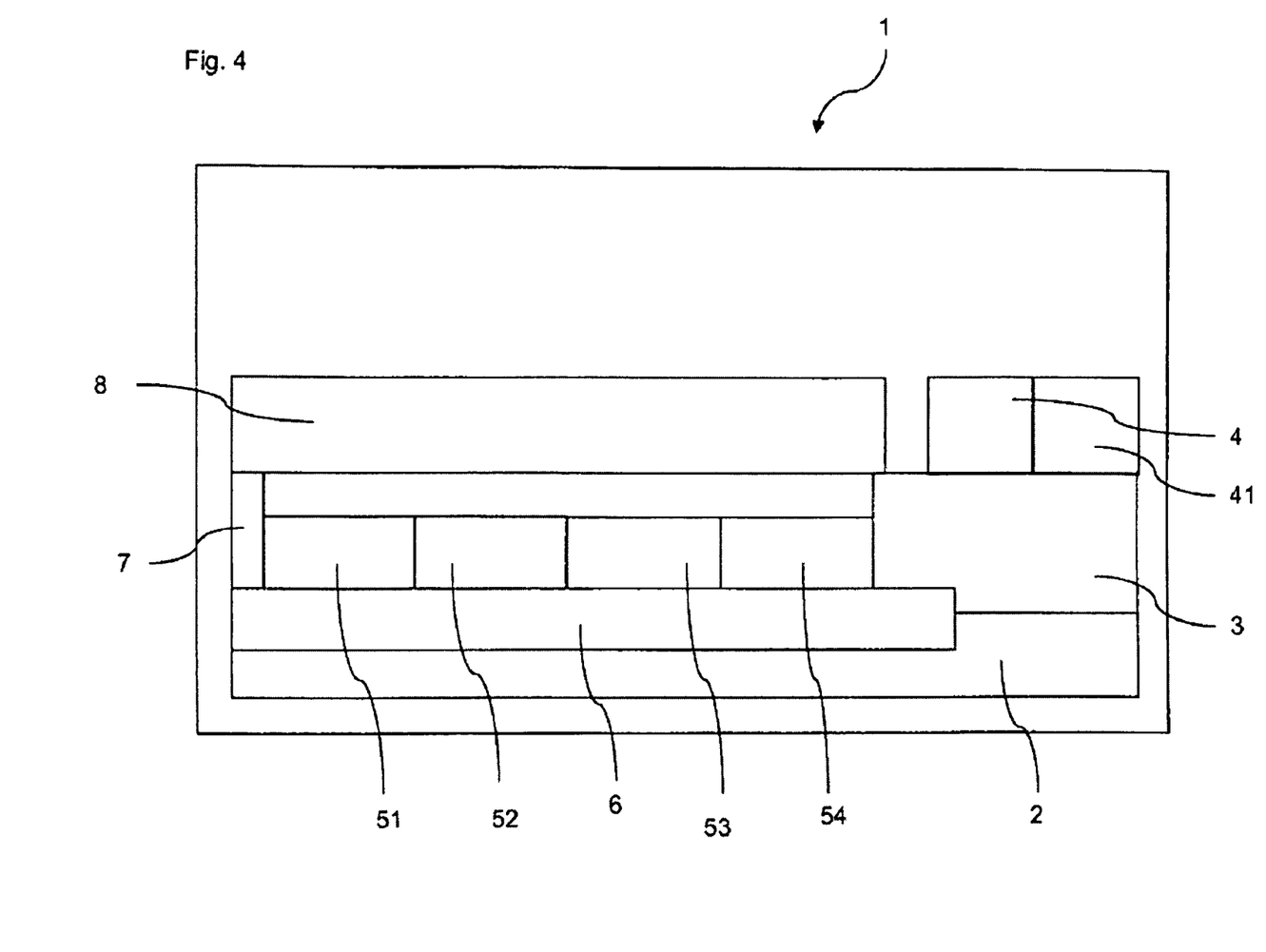
FIG. 4 shows a chip card according to the invention with a second, uniform operating system kernel level and an interface to a virtual operating system.

In this way, operating system functionalities can be developed once and can be uniformly executed on different chip cards 1, if an interface 7 is provided to the implemented second, uniform operating system kernel level 6; see FIG. 4. An applications manufacturer can convert all operating system functionalities to application level 4 and thus to a virtual operating system 8, which can be carried on all different chip cards 1, 1a, 1b, 1c having the implemented second, uniform operating system kernel level 6 and corresponding interface 7. Interface 7 thus represents a type of tunnel between the virtual operating system 8 and the second, uniform operating system kernel level 6. The virtual operating system 8 can thus be based on Java, but it may also be based on another programming language.

Figure 5:
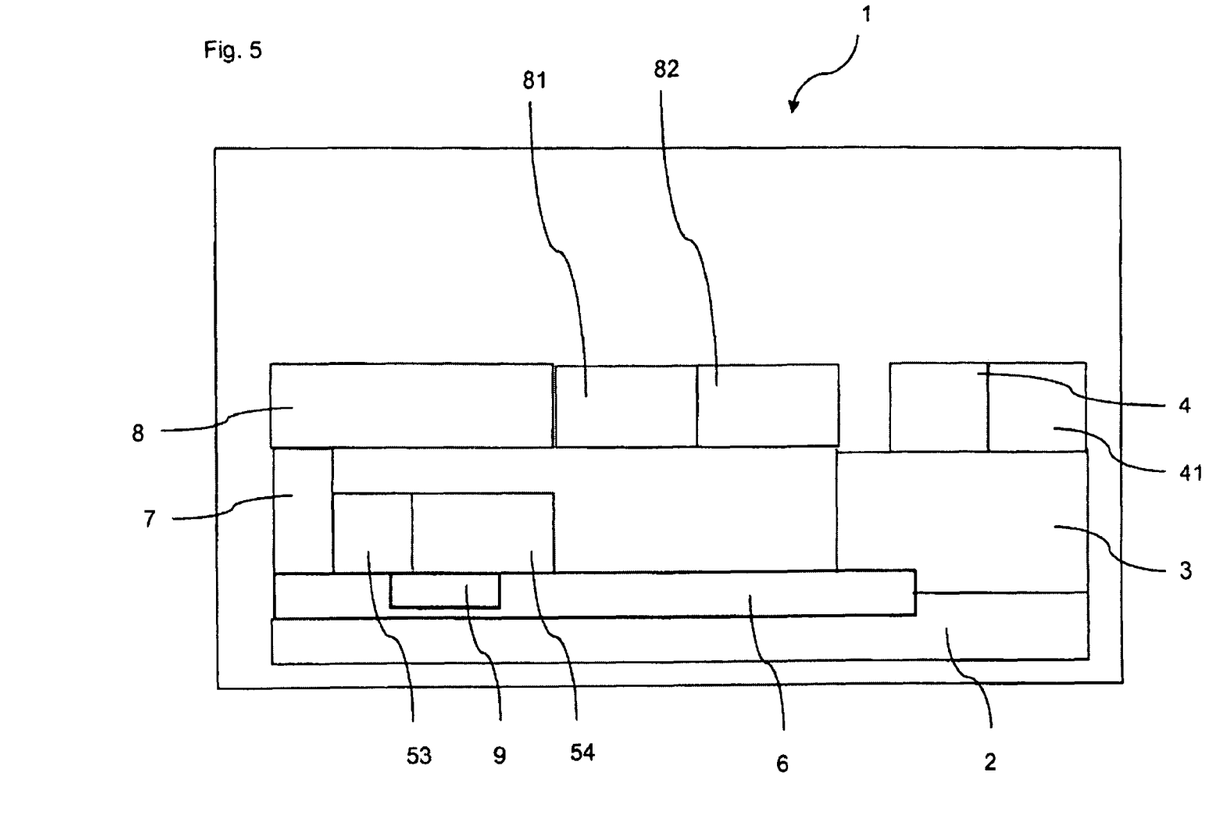
FIG. 5 shows a chip card according to the invention with a second, uniform operating system kernel level, an interface to a virtual operating system as well as a switch.

FIG. 5 shows another embodiment of chip card 1 according to the invention. Chip card 1 has a second, uniform operating system kernel level 6, an interface 7 between the second, uniform operating system kernel level 6 and a virtual operating system 8, as well as an addressable switch 9. The addressable switch 9 is preferably provided in the second, uniform operating system kernel level 6. Switch 9 makes possible a selection of whether an operating system functionality will be executed based on operating system 5 of the manufacturer of chip card 1 or based on virtual operating system 8 which is implemented via interface 7. Thus, memory management 81 and security functions 82 can be executed based on virtual operating system 8, while air interface 53 and other functions 54 are executed based on operating system 5 of the manufacturer of chip card 1. For the case when access is made via virtual operating system 8 to the functionalities of the chip of chip card 1, the operating system 5 provided by the manufacturer deactivates its own operating system functionalities which use the same rudimentary commands. In the case when several functionalities of the virtual operating system 8 which access the functionalities of the chip are cancelled, the operating system activates its own operating system functionalities. For this purpose, the addressable switch 9 is implemented in the operating system of the chip card, particularly in the first and/or second operating system kernel level 2, 6.

LIST OF REFERENCE NUMBERS 1, 1a, 1b, 1c Chip cards
2, 2a, 2b, 2c First operating system kernel level
3, 3a, 3b, 3c Java virtual machine
4, 4a, 4b, 4c Applications
5 Operating system
6 Second, uniform operating system kernel level
7 Interface (tunnel)
8 Virtual operating system
9 Switch
41 Additional application
51, 52, 53, 54 Functionalities of the operating system
81, 82 Functionalities of the virtual operating system

The invention claimed is:

1. A chip card, particularly a smart card, having a built-in chip, having an operating system which controls the functions of the chip card and which is implemented on the chip card, and having a first operating system kernel level, which represents the core of the operating system and in which the process and data organization of the operating system is established, said first operating system kernel level controlling the fundamental functions of the chip of the chip card on the low level, is hereby characterized in that a second, uniform operating system kernel level is provided, said second operating system kernel level controlling the fundamental functions of the chip of the chip card on the low level, said second operating system kernel level being adapted for making possible a uniform accessing of functions of the first operating system kernel level, in which those functions of the first operating system kernel level that can be addressed from outside the operating system are defined, in that an interface is provided for accessing the second, uniform operating system kernel level from outside the operating system, and in that an addressable switch is provided in the operating system, particularly in the second, uniform operating system kernel level.

2. The chip card according to claim 1, further characterized in that the interface is implemented in the operating system of the chip card.

3. The chip card according to claim 1, further characterized in that the chip card is Java-based, that the chip card has at least one Java virtual machine and that the chip card has a Java application level.

4. The chip card according to claim 3, further characterized in that the Java application level is joined with the second, uniform operating system kernel level via the interface in the operating system.

5. The chip card according to claim 4, further characterized in that at least one programming interface is provided, which is joined with the interface in the operating system.

6. The chip card according to one of claims 3 to 5, further characterized in that the second, uniform operating system kernel level is implemented in the at least one Java virtual machine.

7. A method for the software-based modification of a chip card, particularly a smart card, having a built-in chip, having an operating system which controls the functions of the chip card and which is implemented on the chip card, and having a first operating system kernel level which represents the core of the operating system and in which the process and data organization of the operating system is established, said first operating system kernel level controlling the fundamental functions of the chip of the chip card on the low level, is hereby characterized in that access to a second, uniform operating system kernel level from outside the operating system is made via an interface, said interface being implemented in the operating system of the chip card, said second operating system kernel level controlling the fundamental functions of the chip of the chip card on the low level, said second operating system kernel level being adapted for making possible a uniform accessing of functions of the first operating system kernel level, whereby those functions of the first operating system kernel level that can be addressed from outside the operating system are defined in the second, uniform operating system kernel level that a virtual operating system is created via said second uniform operating system kernel level and that via an addressable switch, which is provided in the operating system, particularly in the second, uniform operating system kernel level, a switching procedure is performed such that an operating system operation on the basis of the implemented operating system or on the basis of the virtual operating system is executed.

8. The chip card according to claim 2, further characterized in that the chip card is Java-based, that the chip card has at least one Java virtual machine and that the chip card has a Java application level.

9. The chip card according to claim 8, further characterized in that the Java application level is joined with the second, uniform operating system kernel level via the interface in the operating system.

10. The chip card according to claim 9, further characterized in that at least one programming interface is provided, which is joined with the interface in the operating system.

11. The chip card according to one of claims 8 to 10, further characterized in that the second, uniform operating system kernel level is implemented in the at least one Java virtual machine.

12. The chip card according to claim 1, further characterized in that the chip card is Java-based, that the chip card has at least one Java virtual machine and that the chip card has a Java application level.

13. The chip card according to claim 12, further characterized in that the Java application level is joined with the second, uniform operating system kernel level via the interface in the operating system.

14. The chip card according to claim 13, further characterized in that at least one programming interface is provided, which is joined with the interface in the operating system.

* * * * *